United States Patent [19]

Morgan et al.

[11] 4,374,963
[45] Feb. 22, 1983

[54] HEAT CURABLE EPOXY-ACRYLATE COMPOSITIONS

[75] Inventors: Charles R. Morgan, Brookeville; David R. Kyle, Columbia, both of Md.

[73] Assignee: W. R. Grace & Co., New York, N.Y.

[21] Appl. No.: 317,648

[22] Filed: Nov. 2, 1981

[51] Int. Cl.³ ............... C08G 59/40; C08G 59/68
[52] U.S. Cl. ............... 525/486; 525/454; 525/481; 525/485; 525/502; 525/507; 525/524; 525/531; 525/922; 528/89; 528/91; 528/92; 528/103; 528/106; 528/123; 528/361; 528/365; 427/386; 428/413; 428/414
[58] Field of Search ............ 525/507, 524, 531, 922, 525/454, 481, 502, 485, 486; 528/89, 91, 92, 103, 106, 123, 361, 73, 365

[56] References Cited

U.S. PATENT DOCUMENTS

| | | | |
|---|---|---|---|
| 3,773,702 | 11/1973 | Ohashi | 525/922 X |
| 4,200,705 | 4/1980 | Davis | 525/524 X |
| 4,221,892 | 9/1980 | Baron et al. | 525/531 X |
| 4,348,506 | 9/1982 | Ganguli et al. | 525/922 X |

*Primary Examiner*—Earl A. Nielsen
*Attorney, Agent, or Firm*—Richard P. Plunkett; William W. McDowell, Jr.

[57] ABSTRACT

This invention relates to a heat curable composition comprising
(a) a liquid, ethylenically unsaturated monomer, oligomer or prepolymer of the formula:

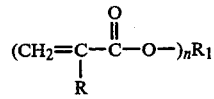

wherein R is H or CH₃, R₁ is an organic moiety and n is at least 2,
(b) an epoxy resin containing at least two

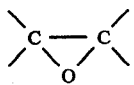

groups, and
(c) a thermal initiator member of the group consisting of
  (1) a substituted or unsubstituted diaryliodonium salt in combination with a free radical initiator,
  (2) a BF₃ adduct,
  (3) a BF₃ adduct in combination with a free radical initiator, and
  (4) dicyandiamide in combination with a free radical initiator.

The system is stable at ordinary temperatures, but on heating the thermal initiator catalyzes the curing of the acrylate and the epoxy resin.

4 Claims, No Drawings

HEAT CURABLE EPOXY-ACRYLATE COMPOSITIONS

BACKGROUND OF THE INVENTION

1. Field of the Invention

This invention relates to a heat curable acrylate-epoxy resin composition. The initiator system for the composition is stable at ordinary temperatures but on heating the thermal initiator catalyzes the cocuring of the acrylate and the epoxy resin. The composition can be used to form adhesives, coatings and sealants.

2. Description of the Prior Art

It is known from U.S. Pat. No. 4,225,691 that the diaryliodonium salts are operable per se to initiate curing of epoxy resins. The curing rate however is of the order of 30 minutes or more.

It is also known from U.S. Pat. No. 4,288,527 to expose a composition comprising an ethylenically unsaturated compound, photoinitiator and a substituted or unsubstituted pinacol to UV radiation and heat in seriatium or simultaneously to obtain a cured solid product.

It is well known that $BF_3$ adducts and dicyandiamide will each cure epoxy resins per se.

OBJECTS OF THE INVENTION

One object of the instant invention is to produce an adhesive composition which is solventless. Another object of the invention is to produce a composition which can be used as a sealant or coating. Still another object of the instant invention is to produce an adhesive composition which is heat curable in a minimum time period. Other objects will become apparent from a reading hereinafter.

DESCRIPTION OF THE INVENTION

This invention relates to a heat curable composition comprising (a) a liquid, ethylenically unsaturated monomer, oligomer or prepolymer of the formula:

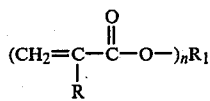

wherein R is H or $CH_3$, $R_1$ is an organic moiety and n is at least 2, (b) an epoxy resin containing at least two

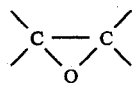

groups, and (c) a thermal initiator member of the group consisting of
(1) a substituted or unsubstituted diaryliodonium salt in combination with a free radical initiator,
(2) a $BF_3$ adduct,
(3) a $BF_3$ adduct in combination with a free radical initiator, and
(4) dicyandiamide in combination with a free radical initiator.

The system is stable at ordinary temperatures, but on heating the thermal initiator catalyzes the curing of the acrylate and the epoxy resin.

The composition after application to the parts to be bonded or sealed forms a thermoset bond or seal on application of heat thereto, preferably by high frequency techniques including dielectric or induction heating. Although the composition and process taught herein is operable to form a thermoset coating bond or seal, the invention for the most part for reasons of brevity will be explained in terms of adhesive bonding.

The liquid ethylenically unsaturated monomer, oligomer or prepolymer, i.e., the acrylate terminated polyene, of the formula:

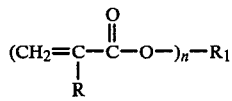

wherein R is H or $CH_3$, $R_1$ is an organic moiety and n is at least 2 of the composition herein, can be made by various reactants and methods. One of these acrylate terminated materials is a polyether polyol urethane polyacrylate formed by reacting a polyether polyol with a polyisocyanate and a hydroxyalkyl acrylate. Another material may be a polyester polyol urethane polyacrylate formed by reacting a polyester polyol with a polyisocyanate and a hydroxyalkyl acrylate. Still another material in this category is an epoxy acrylate formed by reacting a diepoxide with acrylic acid. Yet another acrylate terminated material operable herein is a polyether or a polyester acrylate formed by end-capping a polyether polyol or polyester polyol with acrylic acid or acryoyl chloride. Yet another acrylate terminated material operable herein is a urethane polyacrylate formed by end-capping a diisocyanate with a hydroxyalkyl acrylate. As used herein, the term "acrylate" refers to both acrylates and methacrylates. Examples of the above acrylate terminated materials include, but are not limited to, 1,3-butylene glycol diacrylate, diethylene glycol diacrylate, 1,6-hexanediol diacrylate, neopentyl glycol diacrylate, polyethylene glycol 200 diacrylate, tetraethylene glycol diacrylate, triethylene glycol diacrylate, pentaerythritol tetraacrylate, tripropylene glycol diacrylate, ethoxylated bisphenol-A diacrylate, trimethylolpropane triacrylate, di-trimethylol propane tetraacrylate, triacrylate of tris(hydroxyethyl)isocyanate, dipentaerythritol pentaacrylate, pentaerythritol triacrylate, ethoxylated trimethylolpropane tiracrylate, triethylene glycol dimethacrylate, ethylene glycol dimethacrylate, tetraethylene glycol dimethacrylate, polyethylene glycol-200 dimethacrylate, 1,6-hexanediol dimethacrylate, neopentyl glycol dimethacrylate, polyethylene glycol-600 dimethacrylate, 1,3-butylene glycol dimethacrylate, ethoxylated bisphenol-A dimethacrylate, trimethylolpropane trimethacrylate, diethylene glycol dimethacrylate, 1,4-butanediol diacrylate, diethylene glycol dimethacrylate, pentaerythritol tetramethacrylate, glycerin dimethacrylate, trimethylolpropane dimethacrylate, pentaerythritol trimethacrylate, pentaerythritol dimethacrylate and pentaerythritol diacrylate.

The epoxy resin to be used in the composition of the invention comprises those materials possessing at least two epoxy, i.e.,

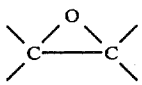

groups. These compounds may be saturated or unsaturated, aliphatic, cycloaliphatic, aromatic or heterocyclic and may be substituted with substituents, such as chlorine, hydroxyl groups, ether radicals and the like.

The term "epoxy resin" when used herein and in the appended claims contemplates any of the conventional monomeric, dimeric, oligomeric or polymeric epoxy materials containing a plurality, at least 2, epoxy functional groups. Preferably, they will be members of classes described chemically as (a) an epoxidic ester having two epoxycycloalkyl groups; (b) an epoxy resin prepolymer consisting predominately of the monomeric diglycidyl ether of bisphenol-A; (c) a polyepoxidized phenol novolak or cresol novolak; (d) a polyglycidyl ether of a polyhydric alcohol; (e) diepoxide of a cycloalkyl or alkylcycloalkyl hydrocarbon or ether; or (f) a mixture of any of the foregoing. To save unnecessarily detailed description, reference is made to the Encyclopedia of Polymer Science and Technology, Vol. 6, 1967, Interscience Publishers, New York, pages 209–271.

Suitably commercially available epoxidic esters are preferably, 3,4-epoxycyclohexylmethyl 3,4-epoxycyclohexanecarboxylate (Union Carbide ERL 4221, Ciba Geigy CY-179); as well as bis(3,4-epoxy-6-methylcyclohexylmethyl)adipate (Union Carbide ERL 4289); and bis(3,4-epoxycyclohexylmethyl)adipate (Union Carbide ERL 4299).

Suitable commercially available diglycidyl ethers of bisphenol-A are Ciba Geigy Araldite 6010, Dow Chemical DER 331, and Shell Chemical Epon 828 and 826.

A polyepoxidized phenol formaldehyde novolak prepolymer is available from Dow Chemixcal DEN 431 and 438 and a polyepoxidized cresol formaldehyde novolak prepolymer is available from Ciba-Geigy Araldite 538.

A polyglycidyl ether of a polyhydric alcohol is available from Ciba Geigy, based on butane-1,4-diol, Araldite RD-2; and from Shell Chemical Corp., based on glycerine, EPON 812.

A suitable diepoxide of an alylycycloalkyl hydrocarbon is vinyl cyclohexene dioxide, Union Carbide ERL 4206; and a suitable diepoxide of a cycloalkyl ether is bis(2,3-epoxycyclopentyl)-ether, Union Carbide ERL 0400.

Other examples include the epoxidized esters of the polyethylenically unsaturated monocarboxylic acids, such as epoxidized linseed, soybean, perilla, oiticica, tung, walnut and dehydrated castor oil, methyl linoleate, butyl lineoleate, ethyl 9,12-octadecadienoate, butyl 9,12,15-octadecatrienoate, butyl eleostearate, monoglycerides of tung oil fatty acids, monoglycerides of soybean oil, sunflower, rapeseed, hempseed, sardine, cottonseed oil and the like.

The free radical initiators used herein are selected from substituted or unsubstituted pinacols, azo compounds, thiurams, organic peroxides and mixtures thereof.

The organic peroxides operable are of the general formula:

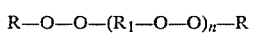

wherein n=0 or 1, R is independently selected from hydrogen, aryl, alkyl, aryl carbonyl, alkaryl carbonyl, aralkyl carbonyl and alkyl carbonyl and $R_1$ is alkyl or aryl, said alkyl groups containing 1 to 20 carbon atoms.

Examples of operable organic peroxides include, but are not limited to 2,5-dimethyl-2,5-di(t-butylperoxy)-hexane, 1,3-bis(t-butylperoxyisopropyl)benzene, 1,3-bis-(cumylperoxyisopropyl)benzene, 2,4-dichlorobenzoyl peroxide, caprylyl peroxide, lauroyl peroxide, t-butyl peroxyisobutyrate, benzoyl peroxide, p-chlorobenzoyl peroxide, hydroxyheptyl peroxide, di-t-butyl diperphthalate, t-butyl peracetate, t-butyl perbenzoate, dicumyl peroxide, 1,1-di(t-butylperoxy)-3,3,5-trimethylcyclohexane and di-t-butyl peroxide.

The organic peroxide is added to the composition in an amount ranging from 0.01–10%, preferably 0.1–5%, by weight based on the weight of the ethylenically unsaturated group member.

Examples of azo compounds operable herein include, but are not limited to, commercially available compounds such as 2-t-butylazo-2-cyanopropane; 2,2'-azobis(2,4-dimethyl-4-methoxy-valeronitrile); 2,2'-azobis(isobutyronitrile); 2,2'-azobis(2,4-dimethylvaleronitrile) and 1,1'-azobis(cyclohexanecarbonitrile).

The azo compound is added to the composition in an amount ranging from 0.001–5%, preferably 0.01–2% by weight based on the weight of the ethylenically unsaturated group member.

The thiurams operable as thermal initiators herein are of the formula

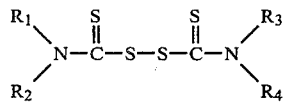

wherein $R_1$, $R_2$, $R_3$ and $R_4$ taken singly can be hydrogen, linear or branched alkyl having from 1 to about 12 carbon atoms, linear or branched alkenyl having from 2 to about 12 carbon atoms, cycloalkyl having from 3 to about 10 ring carbon atoms, cycloalkenyl having from 3 to about 10 ring carbon atoms, aryl having from 6 to about 12 ring carbon atoms, alkaryl having from 6 to about 12 ring carbon atoms, aralkyl having from 6 to about 12 ring carbon atoms and, when taken together, $R_1$ and $R_2$ and $R_3$ and $R_4$ can each be a divalent alkylene group ($-C_nH_{2n}-$) having from 2 to about 12 carbon atoms, a divalent alkenylene group ($C_nH_{2n-2}$) group having from 3 to about 10 carbon atoms, a divalent alkadienylene group $-(C_nH_{2n-4})-$ having from 5 to about 10 carbon atoms, a divalent alkatrienylene group ($C_nH_{2n-6}$) having from 5 to about 10 carbon atoms, a divalent alkyleneoxyalkylene group ($-C_xH_{2x}-OC_xH_{2x}-$) having a total of from 4 to about 12 carbon atoms or a a divalent alkyleneaminoalkylene group

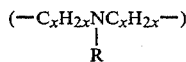

having a total of from 4 to about 12 carbon atoms.

Operable thiurams include, but are not limited to, tetramethylthiuram disulfide, tetraethylthiuram disulfide, di-N-pentamethylenethiuram disulfide, tetrabutylthiuram disulfide, diphenyldimethylthiuram disulfide, diphenyldiethylthiuram disulfide and diethyleneoxythiuram disulfide and the like.

The thiuram is added to the composition in an amount ranging from 0.005–5.0% by weight of the ethylenically unsaturated group member.

The substituted or unsubstituted pinacols operable herein as a thermal initiator in combination with either the diaryliodonium salt, BF$_3$ adduct or dicyandiamide have the general formula:

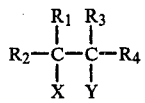

wherein R$_1$ and R$_3$ are the same or different substituted or unsubstituted aromatic radicals, R$_2$ and R$_4$ are substituted or unsubstituted aliphatic or aromatic radicals and X and Y which may be the same or different are hydroxyl, alkoxy or aryloxy.

Preferred pinacols are those wherein R$_1$, R$_2$, R$_3$ and R$_4$ are aromatic radicals, especially phenyl radical and X and Y are hydroxyl.

Examples of this class of compounds include, but are not limited to, benzopinacol, 4,4'-dichlorobenzopinacol, 4,4'-dibromobenzopinacol, 4,4'-diiodobenzopinacol, 4,4',4'',4'''-tetrachlorobenzopinacol, 2,4,2',4'-tetrachlorobenzopinacol, 4,4'-dimethylbenzopinacol, 3,3'-dimethylbenzopinacol, 2,2'-dimethylbenzopinacol, 3,4,3',4'-tetramethylbenzopinacol, 4,4'-dimethoxybenzopinacol, 4,4', 4'',4'''-tetramethoxybenzopinacol, 4,4'-diphenylbenzopinacol, 4,4'-dichloro-4'',4'''-dimethylbenzopinacol, 4,4'-dimethyl-4'',4'''-diphenylbenzopinacol, xanthonpinacol, fluoroenonepinacol, acetophenonepinacol, 4,4'-dimethylacetophenone-pinacol, 4,4'-dichloroacetophenonepinacol, 1,1,2-triphenyl-propane-1,2-diol, 1,2,3,4-tetraphenylbutane-2,3-diol, 1,2-diphenylcyclobutane-1,2-diol, propiophenone-pinacol, 4,4'-dimethylpropiophenone-pinacol, 2,2'-ethyl-3,3'-dimethoxypropiophenone-pinacol, 1,1,1,4,4,4-hexafluoro-2,3-diphenyl-butane-2,3-diol.

As further compounds according to the present invention, there may be mentioned: benzopinacol-mono methylether, benzopinacol-mono-phenylether, benzopinacol and monoisopropyl ether, benzopinacol monoisobutyl ether, benzopinacol mono (diethoxy methyl) ether and the like.

The pinacol is added to the composition in amounts ranging from 0.01–10%, preferably 0.1–5%, by weight based on the weight of the ethylenically unsaturated group member.

The BF$_3$ adducts used herein as thermal initiators include, but are not limited to, C$_6$H$_5$NH$_2$.BF$_3$, 2,6-Et$_2$C$_6$H$_3$NH$_2$.BF$_3$, EtNH$_2$.BF$_3$, sec-Bu$_2$NH.BF$_3$, Et$_2$NH.BF$_3$, (C$_6$H$_5$)$_3$P.BF$_3$, C$_6$H$_5$NMe$_2$.BF$_3$, Pyridine . BF$_3$, and Et$_3$N.BF$_3$, Et$_2$O.BF$_3$, (HOCH$_2$CH$_2$)$_3$N.BF$_3$.

The diaryliodonium salts operable herein as thermal initiators in combination with a pinacol are those set out in U.S. Pat. No. 4,238,587, and it is understood that so much of the disclosure therein relative to the diaryliodonium salts is incorporated herein by reference. That is, the diaryliodonium salts which can be utilized in the practice of the invention are shown as follows:

$$[(R)_a(R^1)_bI]^+[Y]^-,\quad (1)$$

where R is a C$_{(6-13)}$ aromatic hydrocarbon radical, R$^1$ is a divalent aromatic organic radical, and Y is an anion, a is equal to 0 or 2, b is equal to 0 or 1 and the sum of a+b is equal to 1 or 2. Preferably, Y is an MQ$_d$ anion where M is a metal or metalloid, Q is a halogen radical and d is an integer equal to 4–6.

Radicals included within R of formula (1) can be the same or different aromatic carbocyclic radicals having from 6 to 20 carbon atoms, which can be substituted with from 1 to 4 monovalent radicals selected from C$_{(1-8)}$ alkoxy, C$_{(1-8)}$ alkyl, nitro, chloro, etc. R is more particularly phenyl, chlorophenyl, nitrophenyl, methoxyphenyl, pyridyl, etc. Radicals included by R$^1$ of formula (1) are divalent radicals such as

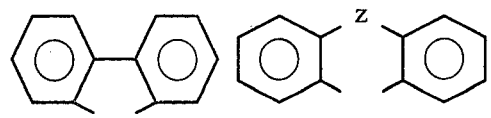

where Z is selected from —O—, —S—,

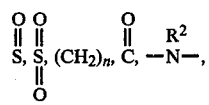

R$^2$ is C$_{(1-8)}$ alkyl or C$_{(6-13)}$ aryl, and n is an integer equal to 1–8 inclusive.

Metals or metalloids included by m of formula (1) are transition metals such as Sb, Fe, Sn, Bi, Al, Ga, In, Ti, Zr, Sc, V, Cr, Mn, Cs, rare earth elements such as the lanthanides, for example, Cd, Pr, Nd, etc., actinides, such as Th, Pa, U, Np, etc., and metalloids such as B, P, As, Sb, etc. Complex anions included by MQ$_d$ are, for example, BF$_4^-$, PF$_6^-$, AsF$_6^-$, SbF$_6^-$, FeCl$_4^-$, SnCl$_6^-$, SbCl$_6^-$, BiCl$_5^{--}$, etc.

Some of the diaryliodonium salts which can be used in the practice of the invention are as follows:

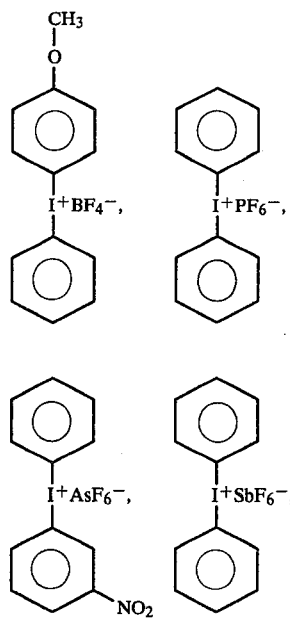

-continued

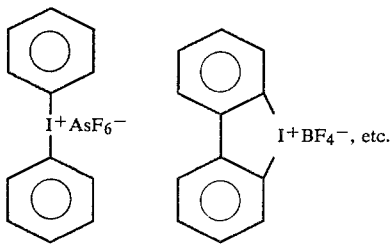

These thermal initiators are added to the system in an amount ranging from 1 to 10% by weight of the epoxy resin.

Thus, when an ethylenically unsaturated group member and an epoxy resin are added in combination to form a thermoset adhesive, in some instances it is necessary to add as a thermal initiator both the aforementioned free radical type and the ionic type in the amounts specified in order to obtain a cocured adhesive. The $BF_3$ adduct is operable per se to initiate the crosslinking reaction but preferably is used in combination with a free radical initiator disclosed herein due to the faster cure rate.

The thermal initiator can be added to the system in various ways. That is, the thermal initiator, per se, can be admixed with the ethylenically unsaturated or epoxy group member. Additionally, the thermal initiator can be dissolved or suspended in a minor amount of well known commercially available solvents such as dibutyl phthalate; ketones, e.g., acetone and methylethyl ketone or chlorinated hydrocarbons such as methylene chloride, and then added to the system.

In practicing the instant invention, the components of the heat activatable adhesive composition can be present in widely varying amounts depending on the end use of the composition. That is, the ethylenically unsaturated or epoxy group member can be present in an amount ranging from 5 to 95% by weight. The percentages of thermal initiators used have previously been set out herein and are based on the weight percent of the ethylenically unsaturated or epoxy group member present.

The compositions of the present invention may, if desired, include such additives as antioxidants, inhibitors, fillers, antistatic agents, flame-retardant agents, thickeners, thixotropic agents, surface-active agents, viscosity modifiers, plasticizers, tackifiers and the like within the scope of this invention. Such additives are usually preblended with the ethylenically unsaturated or epoxy compound prior to or during the compounding step. Operable fillers which can be added to the system to reduce cost include natural and synthetic resins, glass fibers, wood flour, clay, silica, alumina, carbonates, oxides, hydroxides, silicates, glass flakes, borates, phosphates, diatomaceous earth, talc, kaolin, barium sulfate, calcium sulfate, calcium carbonate, wollastonite, carbon fibers and the like. The aforesaid additives may be present in quantities up to 500 parts or more per 100 parts of the composition by weight and preferably about 0.005 to about 300 parts on the same basis.

Additionally, scavengers and antioxidants such as hydroquinone, pyrogallol, phosphorous acid, tert-butyl hydroquinone, tert-butyl catechol, p-benzoquinone, 2,5-diphenylbenzo-quinone, 2,6-di-tert-butyl-p-cresol, etc., are added to the system in conventional amounts ranging from 0.001 to 2.0% by weight of the ethylenically unsaturated member.

Additionally, epoxy resin stabilizers such as phosphites, e.g., triphenyl phosphite, diphenyl phosphite and trisnonylphenyl phosphite are added to the system in conventional amounts ranging from 0.001 to 2.0% by weight of the epoxy esin.

The heating step is usually carried out for a period of 10 seconds to 30 minutes at a temperature of 80°–300° C., preferably 100°–200° C. which is sufficient to fully cure the composition to a solid adhesive, coating or sealant product.

The heating step using a thermal initiator to cure the adhesive organic resin composition can be accomplished in several ways. In simple systems, the adhesive composition can be applied by manual means to an adherend, contacted with another adherend and the assembled system heated in a forced air oven until a thermoset bond results.

Additionally and preferably, electromagnetic heating can be utilized as a faster and more efficient means of curing, especially where the substrates to be bonded are plastic materials. In addition to the formation of high strength bonds, electromagnetic bonding techniques aid in (a) fast bond setting times, and (b) automated part handling and assembly.

In practicing the instant invention, electromagnetic heating can be employed with the adhesive composition herein to adhere (1) plastic to plastic, (2) plastic to metal and (3) metal to metal. For example, dielectric heating can be used to bond (1) and (2) supra if the adhesive composition contains sufficient polar groups to heat the composition rapidly and allow it to bond the adherends. Inductive heating can also be used to bond (1), (2) and (3). That is, when at least one of the adherends is an electrically conductive or ferromagnetic metal, the heat generated therein is conveyed by conductance to the adhesive composition thereby initiating the cure to form a thermoset adhesive. In the instance where both adherends are plastic, it is necessary to add an energy absorbing material, i.e., an electrically conductive or ferromagnetic material, preferably in fiber or particle form (10–400 mesh) to the adhesive composition. The energy absorbing material is usually added in amounts ranging from 0.1 to 2 parts by weight, per 1 part by weight of the adhesive organic resin composition. It is also possible to impregnate the plastic adherend at the bonding joint with particles of the energy absorbing material in order to use inductive heating, but care must be exercised that the plastic is not distorted.

The particulate electromagnetic energy absorbing material used in the adhesive composition when induction heating is employed can be one of the magnetizable metals including iron, cobalt and nickel or magnetizable alloys or oxides of nickel and iron and nickel and chromium and iron oxide. These metals and alloys have high Curie points (730°–2,040° F.).

Electrically conductive materials operable herein when inductive heating is employed include, but are not limited to, the noble metals, copper, aluminum, nickel, zinc as well as carbon black, graphite and inorganic oxides.

There are two forms of high frequency heating operable herein, the choice of which is determined by the material to be adhered. The major distinction is whether or not the material is a conductor or non-conductor of electrical current. If the material is a conductor, such as iron or steel, then the inductive method is used. If the material is an insulator, such as wood, paper, textiles, synthetic resins, rubber, etc., then dielectric heating can also be employed.

Most naturally occurring and synthetic polymers are non-conductors and, therefore, are suitable for dielectric heating. These polymers may contain a variety of dipoles and ions which orient in an electric field and rotate to maintain their aignment with the field when the field oscillates. The polar groups may be incorporated into the polymer backbone or can be pendant side groups, additives, extenders, pigments, etc. For example, as additives, lossy fillers sch as carbon black at a one percent level can be used to increase the dielectric response of the adhesive. When the polarity of the electric field is reversed millions of times per second, the resulting high frequency of the polar units generates heat within the material.

The uniqueness of dielectric heating is in its uniformity, rapidity, specificity and efficiency. Most plastic heating processes such as conductive, convective or infrared heating are surface-heating processes which need to establish a temperature within the plastic and subsequently transfer the heat to the bulk of the plastic by conduction. Hence, heating of plastics by these methods is a relatively slow process with a non-uniform temperature resulting in overheating of the surfaces. By contrast, dielectric heating generates the heat within the material and is therefore uniform and rapid, eliminating the need for conductive heat transfer. In the dielectric heating system herein the electrical frequency of the electromagnetic field is in the range 1–3,000 megahertz, said field being generated from a power source of 0.5–1,000 kilowatts.

Induction heating is similar, but not identical, to dielectric heating. The following differences exist: (a) magnetic properties are substituted for dielectric properties; (b) a coil is employed to couple the load rather than electrodes or plates; and (c) induction heaters couple maximum current to the load. The generation of heat by induction operates through the rising and falling of a magnetic field around a conductor with each reversal of an alternating current source. The practical deployment of such field is generally accomplished by proper placement of a conductive coil. When another electrically conductive material is exposed to the field, induced current can be created. These induced currents can be in the form of random or "eddy" currents which result in the generation of heat. Materials which are both magnetizable and conductive generate heat more readily than materials which are only conductive. The heat generated as a result of the magnetic component is the result of hysteresis or work done in rotating magnetizable molecules and as a result of eddy current flow. Polyolefins and other plastics are neither magnetic nor conductive in their natural states. Therefore, they do not, in themselves, create heat as a result of induction.

The use of the eletromagnetic induction heating method for adhesive bonding of plastic structures has proved feasible by interposing selected eletromagnetic energy absorbing materials in an independent adhesive composition layer or gasket conforming to the surfaces to be bonded, electromagnetic energy passing through the adjacent plastic structures (free of such energy absorbing materials) is readily concentrated and absorbed in the adhesive composition by such energy absorbing materials thereby rapidly initiating cure of the adhesive composition to a thermoset adhesive.

Electromagnetic energy absorbing materials of various types have been used in the electromagnetic induction heating technique for some time. For instance, inorganic oxides and powdered metals have been incorporated in bond layers and subjected to electromagnetic radiation. In each instance, the type of energy source influences the selection of energy absorbing material. Where the energy absorbing material is comprised of finely divided particles having ferromagnetic properties and such particles are effectively insulated from each other by particle containing nonconducting matrix material, the heating effect is substantially confined to that resulting from the effects of hysteresis. Consequently, heating is limited to the "Curie" temperature of the ferromagnetic material or the temperature at which the magnetic properties of such material cease to exist.

The electromagnetic adhesive composition of this invention may take the form of an extruded ribbon or tape, a molded gasket or cast sheet. In liquid form it may be applied by brush to surfaces to be bonded or may be sprayed on or used as a dip coating for such surfaces.

The foregoing adhesive composition, when properly utilized as described hereinafter, results in a solvent free bonding system which permits the joining of metal or plastic items without costly surface pretreatment. The electromagnetically induced bonding reaction occurs rapidly and is adaptable to automated fabrication techniques and equipment.

To accomplish the establishment of a concentrated and specifically located heat zone by induction heating in the context of bonding in accordance with the invention, it has been found that the electromagnetic adhesive compositions described above can be activated and a bond created by an induction heating system operating with an electrical frequency of the electromagnetic field of from about 5 to about 30 megacycles and preferably from about 15 to 30 megacycles, said field being generated from a power source of from about 1 to about 30 kilowatts, and preferably from about 2 to about 5 kilowatts. The electromagnetic field is applied to the articles to be bonded for a period of time of less than about 2 minutes.

As heretofore mentioned, the electromagnetic induction bonding system and improved electromagnetic adhesive compositions of the present invention are applicable to the bonding of metals, thermoplastic and thermoset material, including fiber reinforced thermoset material.

The following examples are set out to explain, but expressly not limit, the instant invention. Unless otherwise noted, all parts and percentages are by weight.

Strength properties of adhesive in shear by tension loading were run in accord with ASTMD 1002-64 based on one inch square of lapped area unless otherwise specified.

EXAMPLE 1

Preparation of Iodobenzene Diacetate 40.8 g (0.2 mol) of iodobenzene were charged to a 300 ml round bottom flask equipped with thermometer and vented addition funnel. 91.2 g (0.48 mol) of a 40% aqueous solution of peracetic acid was added dropwise to the flask over a 25-minute period while maintaining the flask at 30° C. in a water bath. After about 1 hour a yellowish white solid formed. The reaction mixture was cooled in ice and the solid collected, washed with water and vaccuum dried at 40° C. The iodobenzene diacetate product weighed 40.6 g and had a melting point in the range of 157°–160° C.

EXAMPLE 2

Preparation of 4-Methoxydiphenyliodonium Tetrafluoroborate 48.6 g iodobenzene diacetate, 16.3 ml anisole, 65 ml acetic anhydride and 725 ml glacial acetic acid were charged to a 2 liter, 3 neck round bottom flask equipped with stirrer, reflux condenser, thermometer and addition funnel. 8 ml of concentrated sulfuric acid were added dropwise over a 20 minute period to the flask while maintaining the temperature below 10° C. A viscous brown mixture containing white needles formed. The mixture was thawed to room temperature over a 1½ hour period at which point it was stirred for an additional 45 minutes at room temperature. 31 g of sodium bromide in 150 cc of water were added to the solution. Ten solid particles formed which were collected, washed with water and dried. The resultant product, i.e., 47 g of 4-methoxydiphenyliodonium bromide, had a melting point of 165°–168° C.

39.9 g of the 4-methoxydiphenyliodonium bromide were dissolved in 1,000 cc of water and 500 cc of acetone with heating. To this solution were added 25 g (0.13 moles) of silver tetrafluoroborate in 40 cc of water. The silver bromide formed was removed by filtration and the filtrate was reduced in volume by ⅔ in a Buchi rotovapor resulting in a brown liquid which was then refrigerated. 26.8 g of white and brown damp solids were collected from the refrigerated material and dissolved in 100 cc CH$_2$Cl$_2$ and passed through a 1″ by 3″ long neutral alumina column. 100 cc of pale brown liquid was collected. 150 cc of ether were mixed in with the pale brown liquid resulting in the formation of white solids. The white solids were collected, washed with ether and dried. The resultant white solid product weighed 13.3 g and had a melting point of 104°–105° C. Another 50 cc of the CH$_2$Cl$_2$ from the alumina column were collected, washed with ether and dried. The dried product weighed 2.5 g and had a melting point of 98°–99° C. The two resultant products were admixed together. The NMR spectrum of the product was in agreement with the structure for 4-methoxydiphenyliodonium tretrafluoroborate.

Analysis. Calcd. for C$_{13}$H$_{12}$BF$_4$IO: C, 39.22; H, 3.02; B, 2.72; F, 19.11; I, 31.91. Found: C, 39.85; H, 3.02; B, 2.75; F, 17.54; I, 32.78.

EXAMPLE 3

Preparation of Diphenyliodonium Tetrafluoroborate 20 g of silver tetrafluoroborate were dissolved in 20 g of water in a beaker at 60° C. with stirring. 33.52 g of 97% diphenyliodonium chloride were dissolved in 720 g of water in another beaker at 60° C. with stirring. The silver tetrafluoroborate solution was slowly poured into the diphenyliodonium chloride solution and the AgCl precipitate was removed by filtration. The filtrate was refrigerated for 2 days resulting in the formation of white crystals. The filtrate was thawed and refiltered. The resulting white crystal solids from this filtration were washed with water, air dried and then vacuum dried over night to obtain 11.1 g of white crystals. The filtrate was reduced to ⅔ its volume in a Bucchi rotovapor and then refrigerated. After thawing at room temperature the filtrate was refiltered and the white crystals were collected as set out above. The two resultant long white needle products weighed 28.6 g and had a melting point in the range 132°–137° C.

Analysis. Calcd. for C$_{12}$H$_{10}$BF$_4$I: C, 39.16; H, 2.72; B, 2.94; F, 20.67; I, 34.51. Found: C, 39.15; H, 2.64; B, 3.04; F, 20.55; I, 34.98.

The following examples show heat curing of the composition:

EXAMPLE 4

The following mixtures were made up by stirring the components together at room temperature:

| (a) | trimethylolpropane triacrylate | 2.5 g |
| --- | --- | --- |
| | 1,4-butanediol diepoxide | 7.5 g |
| | benzopinacol | 0.3 g |
| | 4-methoxydiphenyliodonium tetrafluoroborate | 0.3 g |
| (b) | 1,4-butanediol diepoxide | 5.0 g |
| | trimethylolpropane triacrylate | 5.0 g |
| | Leepoxy B-550 (BF$_3$ adduct, commercially available from Leepoxy) | 0.3 g |
| | benzopinacol | 0.3 g |
| (c) | 1,4-butanediol diepoxide | 5.0 g |
| | trimethylolpropane triacrylate | 5.0 g |
| | Leepoxy B-550 | 0.3 g |
| (d) | 1,4-butanediol diepoxide | 5.0 g |
| | trimethylolpropane triacrylate | 5.0 g |
| | Leepoxy B-550 | 0.3 g |
| | 1,1-di(ti-butylperoxy)-3,3,5-trimethylcyclohexane | 0.1 g |

Each mixture in a 30 ml beaker was placed in a 120° C. air oven until it became solid and the time required to solidify was recorded for each mixture as shown in TABLE I:

TABLE I

| Mixture | Time to Solidify (sec) |
| --- | --- |
| (a) | 250 |
| (b) | 320 |
| (c) | 730 |
| (d) | 440 |

EXAMPLE 5

The following mixtures were made up by stirring the components together at room temperature:

| (e) | trimethylolpropane triacrylate | 5.0 g |
| --- | --- | --- |
| | 1,4-butanediol diepoxide | 5.0 g |
| | 1,1-di(t-butylperoxy)-3,3,5-trimethylcyclohexane | 0.3 g |
| | diphenyliodonium tetrafluoroborate | 0.3 g |
| (f) | 1,4-butanediol diepoxide | 5.0 g |
| | trimethylolpropane triacrylate | 5.0 g |
| | diphenyliodonium tetrafluoroborate | 0.3 g |
| | tetramethylthiuram disulfide | 0.1 g |
| (g) | 1,4-butanediol diepoxide | 5.0 g |
| | trimethylolpropane triacrylate | 5.0 g |
| | diphenyliodonium tetrafluoroborate | 0.3 g |
| | 2,2-azobis(isobutyronitrile) | 0.3 g |
| (h) | 1,4-butanediol diepoxide | 2.5 g |
| | trimethylolpropane triacrylate | 7.5 g |
| | 1,1-di(t-butylperoxy)-3,3,5-trimethylcyclohexane | 0.3 g |
| | dicyandiamide | 0.6 g |

Each mixture was put in a 4 dram vial and placed in a 170° C. air oven until it became solid. The time required to solidify was recorded for each mixture as shown in TABLE II:

TABLE II

| Mixture | Time to Solidify (sec) |
|---------|------------------------|
| (e)     | 164                    |
| (f)     | 488                    |
| (g)     | 110                    |
| (h)     | 234                    |

EXAMPLE 6

2.5 g of 1,4-butanediol diepoxide, 7.5 g of trimethylolpropane triacrylate, 0.3 g of 4-methoxydiphenyliodonium tetrafluoroborate from Example 2 and 0.3 g of benzopinacol were mixed together by stirring at room temperature in a 30 ml beaker. The beaker was then placed in an air oven heated to 160° C. The mixture cured to a black solid in 3 minutes.

EXAMPLE 7

10 g of 1,4-butanediol diepoxide, 10 g of trimethylolpropane triacrylate, 0.6 g of diphenyliodonium tetrafluoroborate and 0.6 g of benzopinacol were dissolved together. 5 g of the dissolved admixture were charged to a 4 dram vial along with 0.05 g of Ketjenblack. The vial was placed in a J. Trembley Co. radio frequency heater, Model EO*1A and exposed to approximately 100 milliamps of radio frequency energy for 50 seconds. A cured, hard, solid product resulted.

EXAMPLE 8

7.5 g of diglycidyl ether of bisphenol A, 2.5 g of trimethylolpropane triacrylate, 0.3 g of diphenyliodonium tetrafluoroborate and 0.3 g of benzopinacol were dissolved in approximately 10 cc of methylene dichloride after which the methylene dichloride was removed by vacuum. The dissolved admixture was coated onto both cold-rolled steel and fiber reenforced, plastic adherends which were held together in a ½" lap to an adherend of the same composition with a binder clip. The thus clipped adherends were heated in a forced air oven at 160° C. for 20 minutes. After cooling to room temperature the adherends could not be pulled apart by hand.

EXAMPLE 9

7.5 g of diglycidyl ether of bisphenol A, 2.5 g of trimethylolpropane triacrylate, 0.3 g of a BF$_3$ adduct, commercially available from Leepoxy under the tradename "Leepoxy B-550", and 0.3 g of 1,1-di(t-butylperoxy)-3,3,5 trimethylcyclohexane were dissolved in approximately 10 cc of methylene dichloride after which the methylene dichloride was removed by vacuum. The dissolved admixture was coated onto both cold-rolled steel and fiber reenforced, plastic adherends which were held together in a ½" to an adherend of the same composition with a binder clip. The thus clipped adherends were heated in a forced air oven at 160° C. for 20 minutes. After cooling to room temperature the adherends could not be pulled apart.

EXAMPLE 10

The dissolved admixture from Example 8 was drawn down on a cold-rolled steel substrate and also onto a glass fiber reenforced polyester substrate to form an approximately 5 mil thick coating. The thus coated substrates were placed in a forced air oven to 160° C. for 20 minutes. A cured, tack-free, hard coating on each substrate resulted.

EXAMPLE 11

Example 10 was repeated with the admixture from Example 9. A cured, tack-free, hard coating on both substrates resulted.

EXAMPLE 12

Preparation of Ethylenically Unsaturated Prepolymer 900 g of toluene diisocyanate, 0.952 g of stannous octoate and 12.6 g of triphenyl phosphite were charged to a 3-liter resin kettle equipped with a stirrer, thermometer and dropping funnel. 599.8 g of 2-hydroxyethylacrylate were added dropwise over a 1-hour period while maintaining the temperature between 40°-50° C. by use of a cooling bath. The mixture was stirred for 2 hours at 45°-50° C. 0.952 g of stannous octoate and 0.51 g of p-methoxyphenol were added to the mixture followed by the dropwise addition over a 1½ hour-period of 1,056.7 g of a branched polyester of 1,3-butylene glycol, glycerin, adipic acid and phthalic acid sold under the tradename "LEXOREZ-5162-280" by INOLEX. The LEXOREZ material contained 5.04 meq OH/g and had a hydroxyl functionality of 2.6. The temperature was allowed to rise to 90° C. and maintain thereat for approximately 2 hours at which time the NCO content was 0.02 meq/g as measured by IR. The resultant ethylenically unsaturated product was a clear glossy solid at room temperature. The viscosity of the product at elevated temperatures ranged from 10,000 cps at 71° C. to 14,500 cps at 90° C. The ethylenically unsaturated prepolymer will hereinafter be referred to as prepolymer A.

EXAMPLE 13

5 parts of prepolymer A from Example 12, 5 parts of diglycidyl ether of bisphenol A, commercially available from Dow under the tradename "DER-331", 0.3 parts of diphenyliodonium tretrafluoroborate, 0.3 parts of benzopinacol were dissolved together in about 20 cc methylene chloride and 3.5 parts of Standard-03 iron powder supplied by EMABond Co. were admixed therein. The solvent was removed by vacuum keeping the iron powder well mixed to form a thermoplastic adhesive. The adhesive in a one half inch lap, 20 mils thick tape was applied to one of two fiberglass and polyester composite adherends, commercially available from Budd Co. as SMC substrates. The adherends were pressed together and cured for 60 seconds at 95–100% load on a 2 kw EMABond generator, Model EA-20. The lap shear strength averaged 692±75 psi on five test samples.

EXAMPLE 14

5 parts of prepolymer A from Example 12, 5 parts of diglycidyl ether of bisphenol A, commercially available from Dow under the tradename "DER-331", 0.15 parts of a BF$_3$ adduct, commercially available from Leepoxy under the tradename "Leepoxy B-550", 0.15 parts of 1,1-di(t-butyl peroxy)-3,3,5-trimethylcyclohexane were dissolved together in about 20 cc methylene chloride and 3.5 parts of Standard-03 iron powder supplied by EMABond Co. were admixed therein. The solvent was removed by vacuum keeping the iron powder well mixed to form a thermoplastic adhesive. The adhesive in a one half inch lap, 20 mils thick tape was applied to one of two fiberglass and polyester composite adherends, commercially available from Budd Co. as SMC substrates. The adherends were pressed together and cured for 60 seconds at 95–100% load on a 2 kw EMA-bond generator, Model EA-20. The adhesive cured from a liquid to a hard solid. The lap shear strength of five test samples averaged 548±175 psi.

It is claimed:

1. A heat curable composition comprising
   (a) a liquid, ethylenically unsaturated monomer, oligomer or prepolymer of the formula:

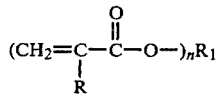

wherein R is H or CH$_3$, R$_1$ is an organic moiety and n is at least 2,
   (b) an epox resin containing at least two

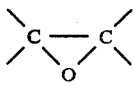

groups, and
   (c) a thermal initiator member of the group consisting of
      (1) a substituted or unsubstituted diaryliodonium salt in combination with a free radical initiator,
      (2) a BF$_3$ adduct,
      (3) a BF$_3$ adduct in combination with a free radical initiator, and
      (4) dicyandiamide in combination with a free radical initiator.

2. The cured composition of claim 1 as a sealant.
3. The cured composition of claim 1 as a coating.
4. The cured composition of claim 1 as an adhesive.

* * * * *

UNITED STATES PATENT AND TRADEMARK OFFICE
CERTIFICATE OF CORRECTION

PATENT NO. : 4,374,963
DATED : February 22, 1983
INVENTOR(S) : Charles R. Morgan et al It is certified that error appears in the above-identified patent and that said Letters Patent is hereby corrected as shown below:

In column 15, line 20; delete the word "epox" and insert therefor the word --epoxy--.

Signed and Sealed this

Third Day of May 1983

[SEAL]

Attest:

Attesting Officer

GERALD J. MOSSINGHOFF

Commissioner of Patents and Trademarks